US007575154B2

(12) United States Patent
Rothschild

(10) Patent No.: US 7,575,154 B2
(45) Date of Patent: Aug. 18, 2009

(54) SYSTEM AND METHOD FOR ISSUING AND MANAGING A PLURALITY OF CREDIT CARD ACCOUNTS

(75) Inventor: Leigh M. Rothschild, Plantation, FL (US)

(73) Assignee: Reagan Inventions, LLC, Sunny Isles Beach, FL (US)

( * ) Notice: Subject to any disclaimer, the term of this patent is extended or adjusted under 35 U.S.C. 154(b) by 294 days.

(21) Appl. No.: 11/212,419

(22) Filed: Aug. 26, 2005

(65) Prior Publication Data
US 2007/0045402 A1 Mar. 1, 2007

(51) Int. Cl.
*G06Q 40/00* (2006.01)
(52) U.S. Cl. .......................... 235/379; 705/38
(58) Field of Classification Search ................. 235/379; 705/35, 38, 5
See application file for complete search history.

(56) References Cited
U.S. PATENT DOCUMENTS 5,256,863 A * 10/1993 Ferguson et al. ............. 705/21
6,144,948 A * 11/2000 Walker et al. ................. 705/38
7,546,266 B2 * 6/2009 Beirne et al. .................. 705/37
2002/0147669 A1 * 10/2002 Taylor et al. .................. 705/35
2003/0050850 A1 * 3/2003 Sesek ........................... 705/26
2007/0083400 A1 * 4/2007 Katz ............................. 705/5
2008/0228611 A1 * 9/2008 Lilly et al. .................... 705/34

* cited by examiner

*Primary Examiner*—Jamara A Franklin
(74) *Attorney, Agent, or Firm*—Anthony J. Casella; Gerald E. Hespos

(57) ABSTRACT

A system and method for issuing and managing a plurality of credit cards are provided. The system and method enables a merchant to sign up customers for their proprietary, e.g., merchant/house, credit card without credit risk to the merchant and then allowing the customers to utilize the proprietary account without carrying the merchant's credit card. The method includes the steps of verifying a first credit card account for an amount of a transaction; retrieving a first customer record from a database using information from the first credit card account; determining if the customer qualifies for a second credit card account; issuing the second credit card account to the customer if the customer qualifies; and charging the amount to the second credit card account, wherein if the customer does not qualify for the second credit card account, charging the amount of the transaction to the first credit card account.

23 Claims, 5 Drawing Sheets

SYSTEM AND METHOD FOR ISSUING AND MANAGING A PLURALITY OF CREDIT CARD ACCOUNTS

BACKGROUND

1. Field

The present disclosure relates generally to data processing and financial decision systems, and more particularly, to a system and method for issuing and managing a plurality of credit card accounts.

2. Description of the Related Art

Credit cards are a huge business and a large part of the world economy. Credit cards can be basically broken down into three categories: national/universal cards such as MasterCard™ and Visa™; travel and entertainment cards such as American Express™ and Diners Club™; and local merchant/house cards that each store separately issues for their stores (such as Office Depot™, Sears™, Macy's™) or the brands in their store chain, for example, the Gap™ card is valid for all their branded stores including Old Navy™, Gap™, and Banana Republic™. Despite credit risk and credit card fraud which are large factors in the industry, stores are very motivated to issue their own credit cards because of the high profit associated with an individual merchant/house credit card. In many cases, for example, a credit card issuer will charge upwards of 16% interest on unpaid balances, while the merchants cost of extending credit is far below this number.

In fact stores and store employees are extremely motivated to sign up customers to their own brands of credit cards, and acquisition costs of getting a credit card customer can run hundreds of dollars.

Customers for individual stores are frequently incentived by the merchants to sign up for credit cards with special promotions and prizes. Frequently, customers will receive a one-time discount on their purchases if they will sign up for the account. Millions of customers do sign up each year in the United States to receive individual merchant credit cards.

One of the main reasons customers do not sign up for individual store accounts, e.g., a merchant/house accounts, is that they do not wish to carry an individual credit card for each and every store. It is far easier to just keep one or two national credit cards that can be used at hundreds of merchants, then many cards that must be carried. In some cases, if a customer does not have his store card, a store will allow the customer to show a driver's license or other identification and they will look up the customers account number; but in many cases this takes a great deal of time during check-out, if it can be done at all.

Another reason that customers will not sign up for individual store accounts is that the sign up and approval process takes time. While the sign up and approval for most merchants is very automated, it is still a cumbersome and time consuming process that many people are not prepared to go through particularly when the merchant is trying to get them to sign up on the spur of the moment during the check-out process.

Therefore, a need exists for techniques to facilitate signing up customers for proprietary merchant/house credit cards and allowing the customers to use the cards without carrying them, while still maintaining maximum credit security for the merchant and customer.

SUMMARY

A system and method for issuing and managing a plurality of credit cards accounts are provided. The current disclosure describes a system and method that will enable the merchant to instantly sign up customers for their house account, and will then allow the customer to use the house account without carrying individual charge plates and without going through verification of identity other then normal identification procedures.

In one aspect of the present disclosure, a method for issuing and managing at least one credit card account is provided. The method includes the steps of receiving information for a first credit card account for executing a transaction; verifying the first credit card account for an amount of the transaction; retrieving a first customer record from a database using information from the first credit card account; determining if the customer qualifies for a second credit card account; issuing the second credit card account to the customer if the customer qualifies; and charging the amount of the transaction to the second credit card account, wherein the first credit card account is a national credit card and the second credit card account is a house/store/merchant credit card. If the customer does not qualify for the second credit card account, the amount of the transaction is charged to the first credit card account.

In another aspect of the present disclosure, upon at least one subsequent transaction, the method includes the steps of receiving the information for the first credit card account; retrieving the second credit card account using the information from the first credit card account; and charging a second amount for the at least one subsequent transaction to the second credit card account.

In a further aspect of the present disclosure, a terminal for issuing and managing at least one credit card account is provided including an input device configured for receiving information for a first credit card account for executing a transaction; a database storing a first credit card account record and at least one second credit card account record, the first credit card account being cross associated with the at least one second credit card account record; and a processor configured for verifying the first credit card account for an amount of the transaction, retrieving a first customer record from the database using the information from the first credit card account record, determining if the customer qualifies for a second credit card account, and issuing the second credit card account to the customer if the customer qualifies.

In another aspect, a system for issuing and managing a plurality of credit card accounts is provided. The system includes a remote server including a database storing a first credit card account record and at least one second credit card account record, the first credit card account record being cross associated with the second credit card account record; a terminal configured for receiving information for a first credit card account for executing a transaction and for transmitting the first credit card account information to the remote server, wherein the remote server is configured to verify the first credit card account for an amount of the transaction, retrieving a first customer record from the database using the information from the first credit card account record, determining if the customer qualifies for a second credit card account, issuing the second credit card account to the customer if the customer qualifies and transmitting the second credit card account to the terminal.

In a further aspect of the present disclosure, a program storage device readable by a machine, tangibly embodying a program of instructions executable by the machine to perform method steps for issuing and managing a at least one credit card account is provided, the method steps including receiving information for a first credit card account for executing a transaction; verifying the first credit card account for an amount of the transaction; retrieving a first customer record from a database using information from the first credit card account; determining if the customer qualifies for a second credit card account; issuing the second credit card account to the customer if the customer qualifies; and charging the amount of the transaction to the second credit card account.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A system and method for issuing and managing a plurality of credit cards are provided. The system and method of the present disclosure enables a merchant to sign up customers for their proprietary, e.g., merchant/house, credit card without credit risk to the merchant and then allowing the customers to utilize the proprietary account (e.g., house) without carrying the merchant's credit card on their person.

Figure 1:
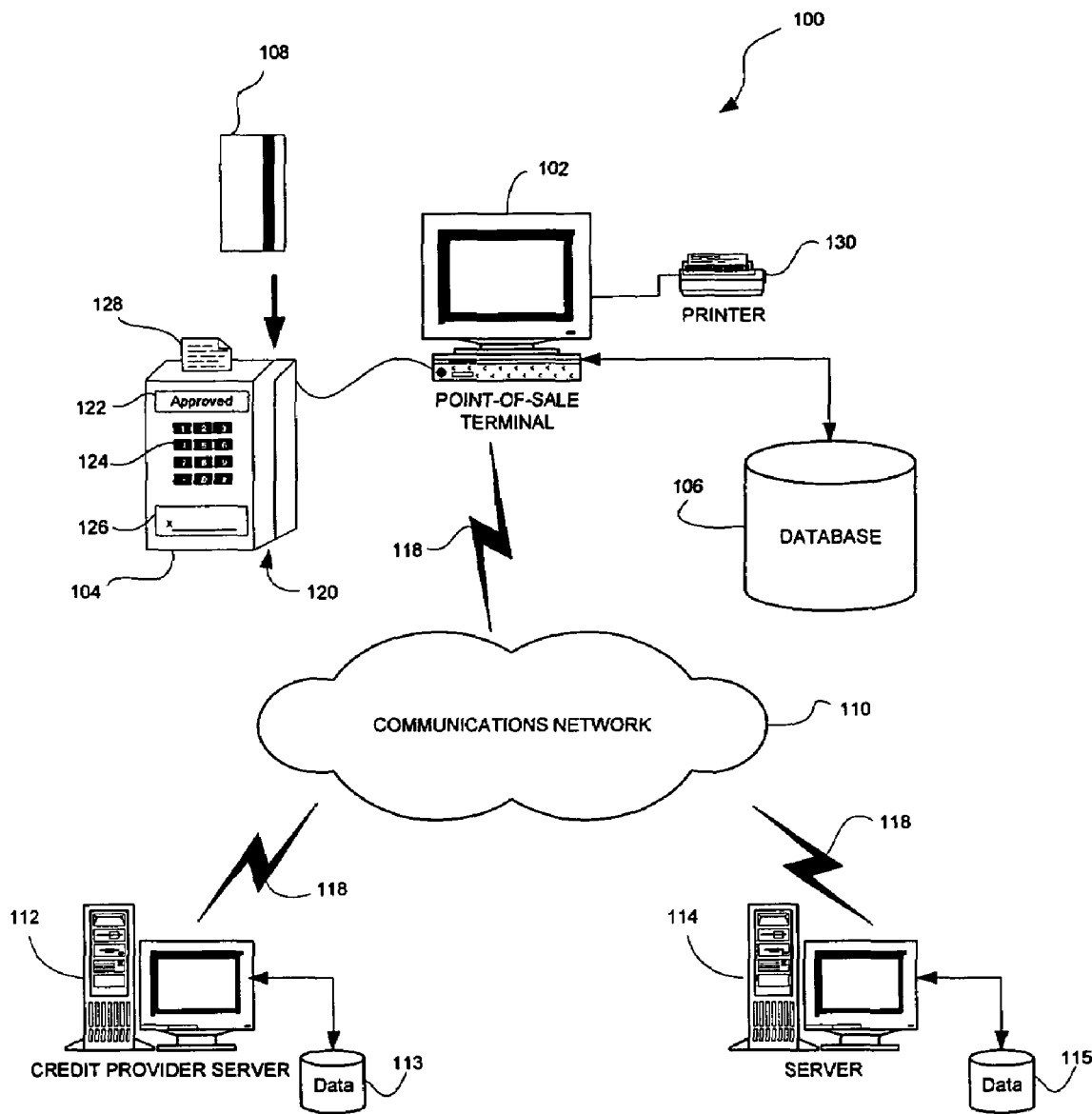
FIG. 1 is a flow diagram of a system for issuing and managing a plurality of credit card accounts in accordance with an embodiment of the present disclosure.

Referring to FIG. 1, a system 100 for issuing and managing a plurality of credit cards is illustrated. The system 100 includes a point-of-sale (POS) terminal 102 for completing a purchasing transaction and an input/output (I/O) customer transaction terminal 104. The (I/O) terminal 104 includes an electronic data capture (EDC) swipe reader 120 for reading information from a credit card 108, a display 122 for providing information to a customer, a keypad 124 for customer entry of information such as a PIN number, and a touch screen 126 for receiving a customer's signature. The (I/O) terminal 104 may also include a printing mechanism 128 for printing receipts, or alternatively, the POS terminal 102 may include a printer 130 for printing receipts, terms, offers, etc. The system 100 further includes a database 106 that includes a plurality of records on customers or holders of national credit cards. This information may be supplied on a secured basis by credit cards companies, e.g., MasterCard™, VISA™, DISCOVER™, etc, and other companies as a means to verify a credit card holder's identity.

Figure 4:
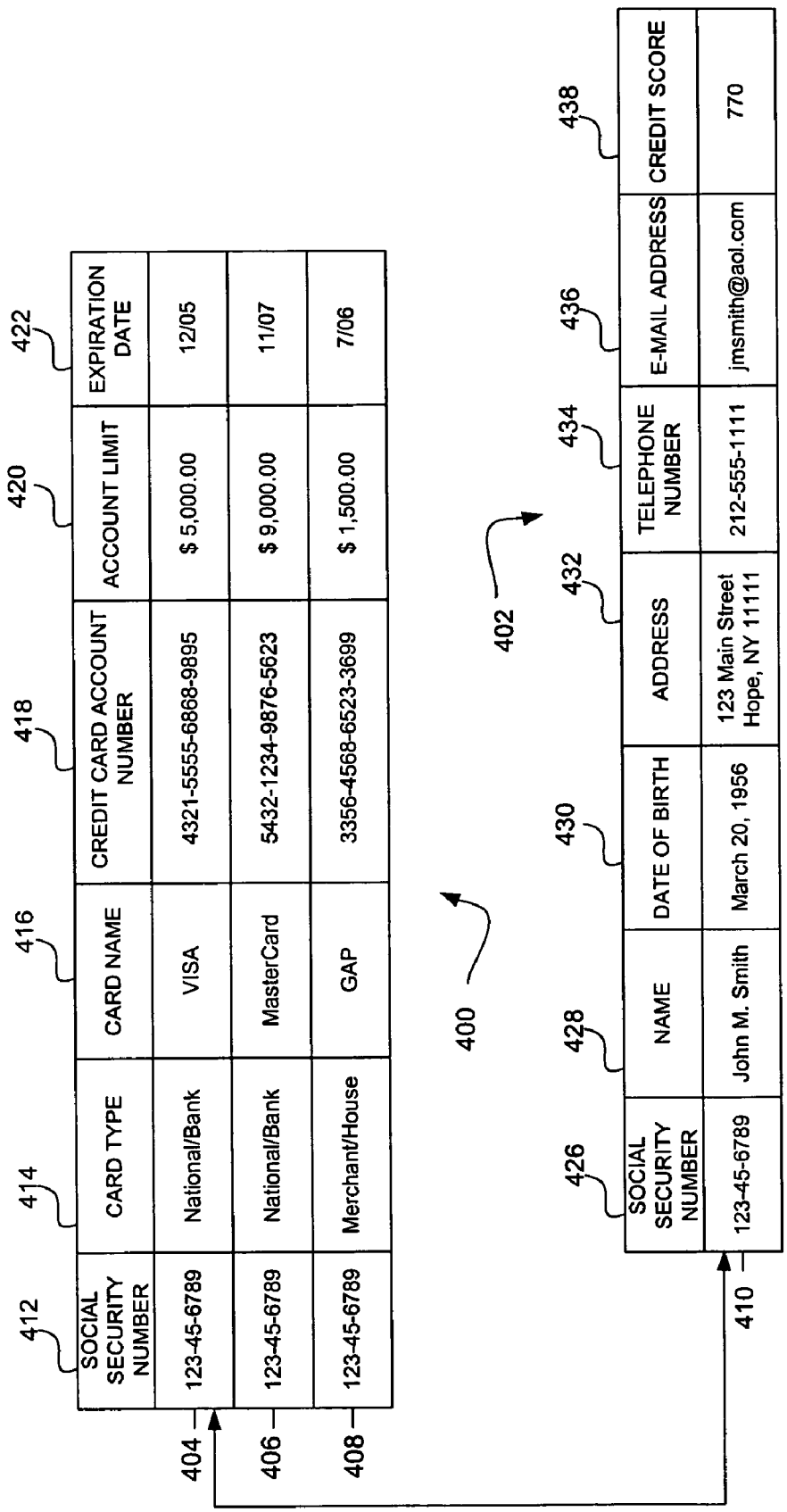
FIG. 4 is a diagram of a plurality of records of a relational database employed in accordance with the present disclosure.

Referring to FIG. 4, the database 106 will includes at least two tables for each customer/holder of a national credit card—a credit card account table 400 and a personal information table 402. The personal information table 402 will include a plurality of fields such as a card holder's social security number 426, the holder's current name 428, the holder's date of birth 430, the holder's address 432, the holder's phone number 434 and/or e-mail address(es) 436. Preferably, the holder's personal information record 410 will include the holder's credit score as generated by any existing credit bureau, e.g., Experian™, Equifax™ and TransUnion™. The credit card account table 400 will include a record 404, 406, 408 for each credit card the holder possess. Each record of the credit card table 400 will include at least the following fields such as social security number 412, card type 414 (e.g., national, travel and entertainment, house/merchant), a corresponding credit card account number 418, an account limit 420 and an expiration date 422. The personal information table 402 will be linked to the credit card account table 400 via the use of primary and foreign keys as is known in the art. In this non-limiting example, the holder's social security number is used as the key.

The system 100 further includes credit provider server 112 for approving transactions conducted with a credit card and communication network 110 for enabling communications between POS terminal 102 and server 112.

Figure 2:
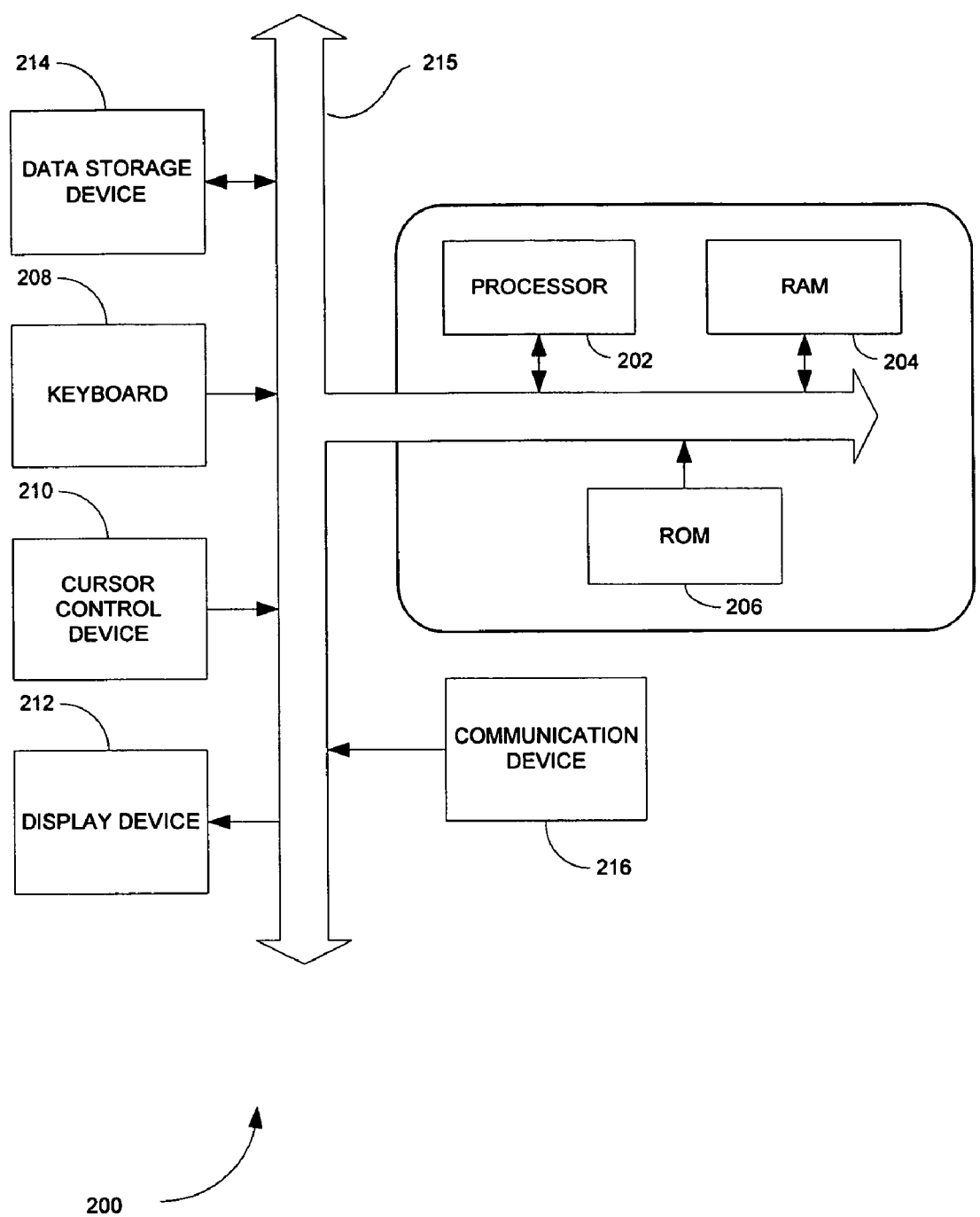
FIG. 2 is an exemplary computer for use in the system shown in FIG. 1.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine, e.g., POS terminal 102 or server 112, comprising any suitable architecture such as a personal computer, a workstation or server. Referring to FIG. 2, preferably, the machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. A system bus 215 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform by various interfaces and bus structures, such a parallel port, serial port or universal serial bus (USB). One such peripheral device may include a communications device 216, e.g., a modem, satellite relay, wireless connection, etc., for enabling communications from the point-of-sale terminal 102 to various credit providers, e.g., credit provider 112. Other peripheral devices may include additional storage devices 214 and a printer.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The POS terminal 102 may operate in a networked environment using logical connections to one or more remote computers. The remote computer may be a personal computer, a server, a router, a network PC, a peer device or other common network node, and typically includes many or all of the elements described above relative to the machine 200. It is to be appreciated that the network 110 may be a local area network (LAN), wide area network (WAN), the Internet or any known network that couples a plurality of computers to enable various modes of communication via network messages. For example, the system may be a corporate intranet including a single server and multiple POS terminals housed within a single facility, or alternatively, multiple servers with multiple POS terminals located in various geographic locations. The POS terminals may communicate to the servers 112, 114 and network 110 via any known communication link 118, for example, dial-up, hardwired, cable, DSL, satellite, cellular, PCS, wireless transmission (e.g., 802.11a/b/g), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 3:
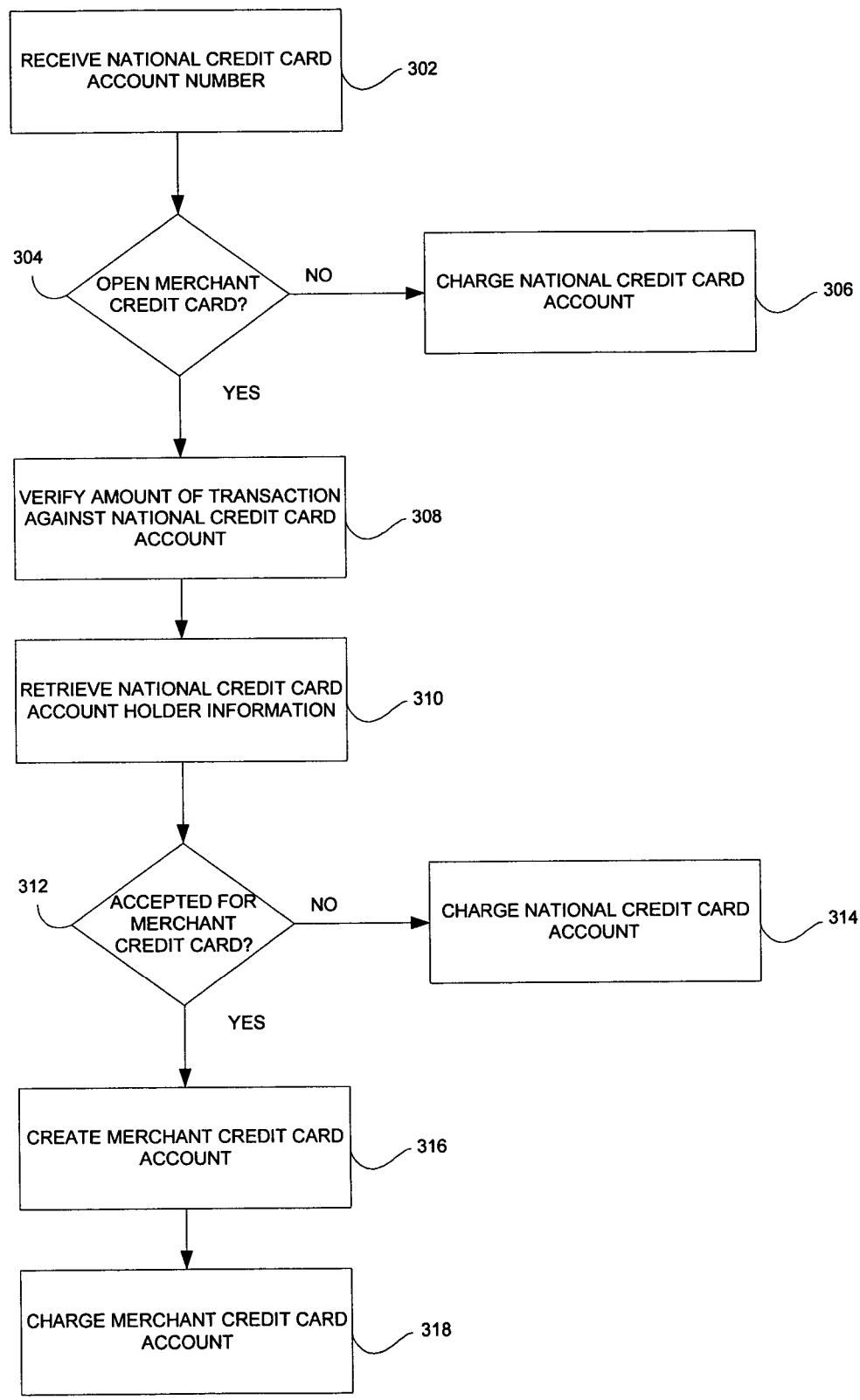
FIG. 3 is a flow diagram illustrating a method for issuing and managing a plurality of credit card accounts in accordance with an embodiment of the present disclosure.

With reference to FIGS. 1, 3 and 4, the method and system of the present disclosure will now be described.

Upon selecting an item for purchase, a customer will approach a service counter or check-out desk of a particular store or merchant to purchase the selected item. When the customer presents a national credit card to the store cashier, the store cashier will ask the customer if they wish to charge the purchase to the individual house/store's account rather then the national card account. The customer will either say "yes" or "no". In the event of a "no", the customer will be asked if they have an individual store account. For example, if the customer is in a Gap™ store and presents a MasterCard™ credit card, the customer will be asked if he would like to charge his purchase to his Gap™ card. If the customer says "no", the customer will be asked if he has a house/store account. If the customer says "no", he /she will be offered an instant store account.

Upon presenting the national credit card, a user of the system 100, e.g., a store clerk/cashier, will enter the credit card information to the POS terminal 102, step 302. The information will be enter into the terminal 102 by entering the information via a keyboard or by reading the information form a magnetic strip located on the credit card via (I/O) terminal 104. The clerk/cashier will than ask the holder of the credit card if they would like to open a house/store/merchant credit card, or alternatively, the question will be presented to the holder via the display 122 of (I/O) terminal 104 (step 304). If the holder answers "no", the national credit card will be charged by the POS terminal 102 accessing the credit provider server 112 as is know in the art.

If the holder desires to open a house credit card, the terminal 102 will verify the credit card for the amount of purchase via credit provider server 112 but will hold the charge (step 308). The clerk will then tell the store POS terminal 102 that the customer is signing up for an individual store account. The customer will then be presented with forms to sign either electronically through terminal 104 via a stylus and touch screen 126 or by paper. The forms may be in the form of a conventional receipt printed by print mechanism 128 or printer 130, where the holder agrees to the amount of the purchase, but will also include the terms and conditions of the new house credit card, e.g., finance charges, annual fees, etc., The clerk will then tell the store POS terminal 102 that the charge to the national card should be held until the customer is approved by the store for their individual account. In many cases, this is an electronic process that just takes a few minutes. However, whether a short or long time period, the customer will not be required to wait because the store will have the customers national credit card as security. The customer will be told and will have agreed that the charges for the purchase will be put on the merchants credit card account (e.g., the new house/store/merchant account) if the account is approved, and put on the national credit card tendered if the account is not approved. The customer will thus be able to sign up for the merchants in store account in approximately the same amount of time that it will take to approve his national credit card.

The customer is then allowed to leave the POS terminal 102 and the computer system can determine the customers suitability for the house credit card with the information that will be contained in the credit card database 106. The terminal 102 will use the national credit card information entered or read from the credit card to access the credit card information table 400. Via the using of primary and foreign keys, the terminal 102 will use information from the credit card account record 404 to access the personal information record 410 of the holder. From the holder's personal record 410, terminal 102 will be able to retrieve the necessary information to establish a house/merchant account for the holder. Preferably, the record 410 will include the holder's credit score. The terminal 102 may determine the holder's suitability for the house credit card based solely on their credit score or by using the information in the holder personal information record 410 to access a credit bureau for approval (step 312). If the customer is suitable, the account will be set up and the customer will receive his card at the address contained in the database. The credit card information table 400 of database 106 will be updated with a new record 408 which will include the customer's new assigned store credit card number, along with the record 404 of the credit card number of the national card that the customer applied with. Both of these numbers will be maintained in the database that the store uses for credit card approvals and both will be cross associated by the database. Once the account is established, the new house credit card account will be charged the amount for the transaction (step 318)

Alternatively, if the customer is rejected in step 312, the holder's purchase will then be charged to his national credit card (step 314). Furthermore, the holder will be notified of the rejection in writing at the address indicated in the database via mail or will be notified via e-mail at the address indicated in the database. It is to be appreciated that the written rejection may be a preformatted form generated automatically by terminal 102.

Figure 5:
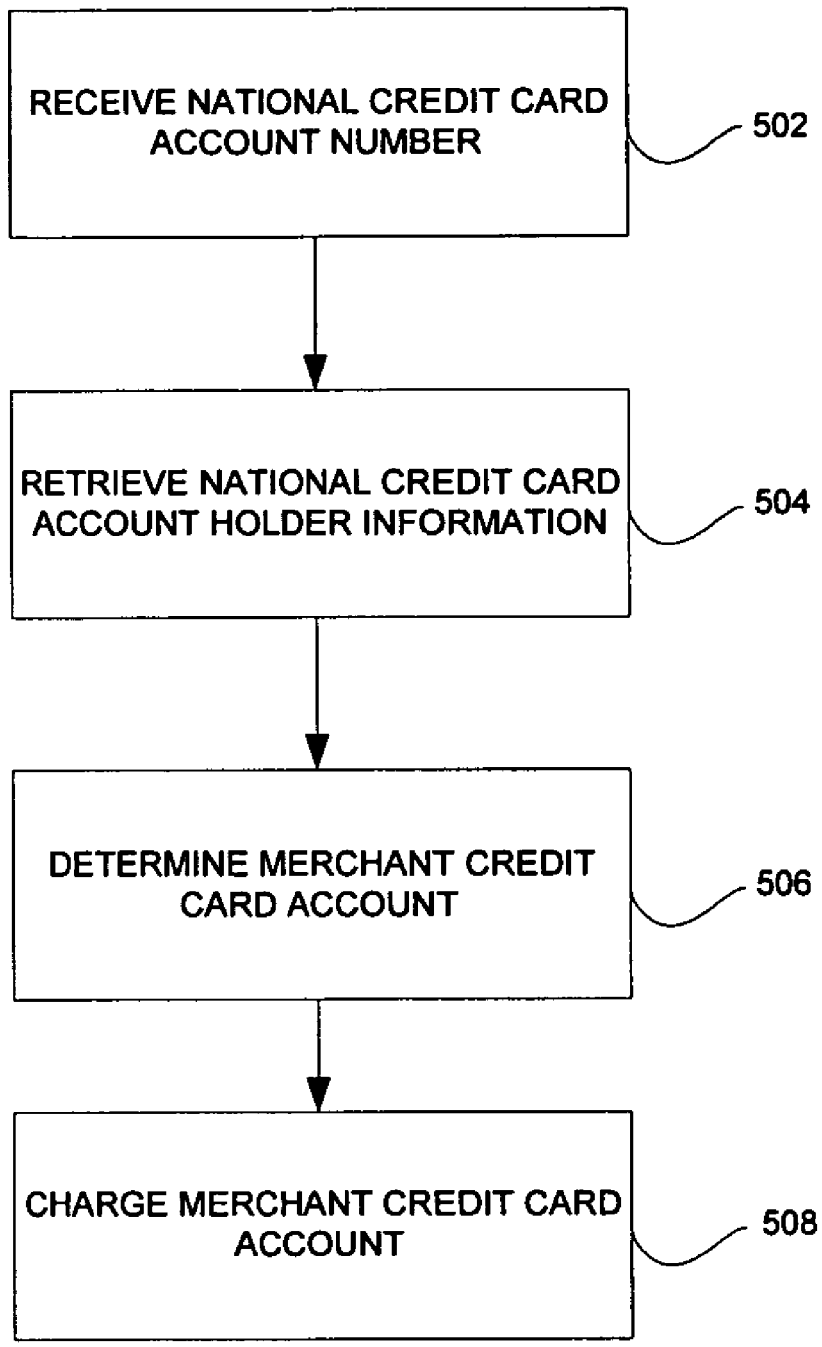
FIG. 5 is a flow diagram illustrating a method for executing a transaction with a single credit card.

Once the second credit card account is created, the holder will be able to charge transactions to the second credit card account without having the second credit card on their person. Referring to FIG. 5, when a holder conducts a subsequent transaction, the holder (at the time of purchase) will indicate that they have a store account. Then, the customer will be asked to present the store card for that account or alternatively the national credit card that he used to sign up for the account or any other national credit card that has been cross associated in database 106. The holder will presents their national card, the point-of-sale terminal 102 will read the card, and transmit this information to the database 106 (step 502). The terminal 102, using standard database software and processing power, will look up the number of the national credit card, and then check to see if a store credit card number is cross associated with this national card (step 506). If the store card is associated with the national card, then the store card number will be processed for credit card approval using the standard approval techniques and protocols that the merchant or approval company maintains (step 508).

In the event that a customer has a store account and then offers a national account card that is not on file (for instance, the customer has changed national account cards or his national account card number has changed) then the customer will be asked to establish and verify his/her identity. The holder will present their national credit card and the information read from the national credit card will be used to locate the personal information record 410 of the card holder. The information contained in the holder's personal information record 410 and the information read from the national credit card will be used to create a new credit card account information record 406 which will be added to table 400 and cross associated with any other existing credit card accounts belong to the holder. Thus allowing the holder to once again present his selected national credit card, as a means of charging purchases to the store/merchant credit card account.

In another embodiment, the system will store the national credit card information into a remote server database 115, accessible by a local point of sale terminal or terminals, e.g., terminal 102, wherein when the national credit card information is presented at purchase, it is either keyed in or electronically input to the terminal, transmitted to the remote server 114, and the remote server 114 will use standard computer dbase programs (such as Oracle™, Microsoft™ SQL, Sybase™, etc) to cross associate and find if that national credit card account is associated with an individual store credit card. If the national credit card is cross associated with a store credit card, the remote server 114 will communicate back to the point-of-sale terminal 102 the store credit card number and credit card name. In a further embodiment, the database 113 may reside with a credit provider server 112 and the credit provider server 112 will also verify the credit card worthiness (e.g., approve or disapprove) of the credit card holder using standard approval algorithms and processing.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for issuing and managing at least one credit card account, the method comprising the steps of:
   receiving information associated with a first credit card account of a customer in response to an initiation of a transaction for a particular institution;
   receiving an indication that the customer chooses to open a second credit card account associated with the particular institution wherein the second credit card account is independent of the first credit card account;
   verifying the first credit card account for an amount of the transaction and holding a charge for the amount of the transaction against the first credit card account as security for the transaction in response to the indication that the customer chooses to open the second credit card account;
   upon verification, providing the item to the customer at a first period of time;
   retrieving at a terminal of the particular institution a first customer record from a database of the particular institution using the information associated with the first credit card account;
   determining if the customer qualifies for the second credit card account based on the first customer record wherein the determining is performed in response to the indication that the customer chooses to open the second credit card account;
   issuing the second credit card account to the customer if the customer qualifies; and
   charging the amount of the transaction to the second credit card account at a later second period of time, wherein the first credit card account is not charged.

2. The method as in claim 1, wherein if the customer does not qualify for the second credit card account, charging the held amount of the transaction to the first credit card account.

3. The method as in claim 1, further comprising the steps of:
   creating a second customer record for the second credit card account; and
   cross associating the first record to the second record.

4. The method as in claim 3, wherein upon at least one subsequent transaction, the method comprising the steps of:
   receiving the information for the first credit card account;
   retrieving the second credit card account using the information from the first credit card account; and
   charging a second amount for the at least one subsequent transaction to the second credit card account.

5. The method as in claim 1, wherein the first credit card account is a national credit card.

6. The method as in claim 1, wherein the second credit card account is a house credit card account.

7. A terminal for issuing and managing at least one credit card account comprising:
   an input device configured for receiving information associated with a first credit card account of a customer in response to an initiation of a transaction for an item from a particular institution;
   a database of the particular institution storing a first credit card account record and at least one second credit card account record, the first credit card account record being cross associated with the at least one second credit card account record; and
   a processor configured for receiving an indication that the customer chooses to open a second credit card account associated with the particular institution wherein the second credit card account is independent of the first credit card account, verifying the first credit card account for an amount of the transaction wherein the verifying includes verifying that the first credit card account has sufficient credit for the amount of the transaction and holding a charge for the amount of the transaction against the first credit card account as security for the transaction in response to the indication that the customer chooses to open the second credit card account, upon verification, providing the item to the customer at a first period of time, retrieving at the terminal a first customer record from the database using the information associated with the first credit card account record, determining if the customer qualifies for the second credit card account based on the first customer record wherein the determining is performed in response to the indication that the customer chooses to open the second credit card account, issuing the second credit card account to the customer if the customer qualifies and charging the amount of the transaction to the second credit card account at a later second period of time, wherein the first credit card account is not charged.

8. The terminal as in claim 7, wherein if the customer does not qualify for the second credit card account, the processor is configured to charge the held amount of the transaction to the first credit card account.

9. The terminal as in claim 7, wherein the processor is configured to create a second customer record for the second credit card account and cross associate the first record to the second record.

10. The terminal as in claim 9, wherein upon at least one subsequent transaction, the processor is configured to receive the information for the first credit card account, retrieve the second credit card account using the information from the first credit card account and charge a second amount for the at least one subsequent transaction to the second credit card account.

11. The terminal as in claim 7, wherein the first credit card account is a national credit card.

12. The terminal as in claim 7, wherein the second credit card account is a house credit card account.

13. The terminal as in claim 7, wherein the input device includes a reader configured to receive the information for the first credit card account.

14. The terminal as in claim 7, further comprising a communication device configured to access a remote server for verifying the amount of the transaction.

15. A system for issuing and managing a plurality of credit card accounts comprising:
a remote server including a database storing a first credit card account record and at least one second credit card account record, the first credit card account record being cross associated with the second credit card account record;
a terminal configured for receiving information associated with a first credit card account of a customer in response to an initiation of a transaction for a particular institution and for transmitting the first credit card account information to the remote server,
wherein the remote server is configured to receive an indication that the customer chooses to open a second credit card account associated with the particular institution and independent of the first credit card account, verify the first credit card account for an amount of the transaction including verifying that the first credit card account has sufficient credit for the amount of the transaction and hold a charge for the amount of the transaction against the first credit card account as security for the transaction in response to the indication that the customer chooses to open the second credit card account, upon verification, providing the item to the customer at a first period of time, retrieve at a terminal of the particular institution a first customer record from the database of the particular institution using the information associated with the first credit card account record, determine if the customer qualifies for the second credit card account based on the first customer record wherein the determining is performed in response to the indication that the customer chooses to open the second credit card account, issue the second credit card account to the customer if the customer qualifies, transmit the second credit card account to the terminal and charge the amount of the transaction to the second credit card account at a later second period of time, wherein the first credit card account is not charged.

16. The system as in claim 15, wherein if the customer does not qualify for the second credit card account, the remote server is configured to charge the held amount of the transaction to the first credit card account.

17. The system as in claim 15, wherein the remote server is configured to create a second customer record for the second credit card account and cross associate the first record to the second record.

18. The system as in claim 17, wherein upon at least one subsequent transaction, the terminal is configured to receive the information for the first credit card account and to transmit the first credit card account information to the remote server and the remote server is configured to retrieve the second credit card account using the information from the first credit card account and charge a second amount for the at least one subsequent transaction to the second credit card account.

19. The system as in claim 15, wherein the first credit card account is a national credit card.

20. The system as in claim 15, wherein the second credit card account is a house credit card account.

21. A program storage device readable by a machine, tangibly embodying a program of instructions executable by the machine to perform method steps for issuing and managing a at least one credit card account, the method steps comprising:
receiving information associated with a first credit card account of a customer in response to an initiation of a transaction for a particular institution;
receiving an indication that the customer chooses to open a second credit card account associated with the particular institution wherein the second credit card account is independent of the first credit card account;
upon verification, providing the item to the customer at a first period of time;
verifying the first credit card account for an amount of the transaction and holding a charge for the amount of the transaction against the first credit card account as security for the transaction in response to the indication that the customer chooses to open the second credit card account wherein the verifying includes verifying that the first credit card account has sufficient credit for the amount of the transaction;
retrieving at a terminal of the particular institution a first customer record from a database of the particular institution using the information associated with the first credit card account;
determining if the customer qualifies for the second credit card account based on the first customer record wherein the determining is performed in response to the indication that the customer chooses to open the second credit card account;
issuing the second credit card account to the customer if the customer qualifies; and
charging the amount of the transaction to the second credit card account at a later second period of time, wherein the first credit card account is not charged.

22. The program storage device as in claim 21, wherein if the customer does not qualify for the second credit card account, charging the amount of the transaction to the first credit card account.

23. The program storage device as in claim 22, further comprising the steps of:
creating a second customer record for the second credit card account; and
cross associating the first record to the second record.

* * * * *